United States Patent [19]

Verdier et al.

[11] Patent Number: 5,160,697
[45] Date of Patent: Nov. 3, 1992

[54] LOWER CONNECTOR FOR A FUEL ASSEMBLY OF A NUCLEAR REACTOR, COMPRISING AN ADAPTOR PLATE AND A FILTRATION PLATE

[75] Inventors: Michel Verdier, Villeurbanne; Regis Mortgat, Couzon-Au-Mont D'Or, both of France

[73] Assignees: Framatome; Cogema, France

[21] Appl. No.: 728,579

[22] Filed: Jul. 11, 1991

[30] Foreign Application Priority Data

Jul. 11, 1990 [FR] France .................. 90 08835

[51] Int. Cl.⁵ .................................. G21C 1/04
[52] U.S. Cl. .......................... 376/352; 376/313; 376/310
[58] Field of Search ............... 376/352, 313, 310, 443, 376/446

[56] References Cited

U.S. PATENT DOCUMENTS

| | | | |
|---|---|---|---|
| 4,559,275 | 12/1985 | Matt | 428/596 |
| 4,684,496 | 8/1987 | Wilson | 376/352 |
| 4,844,861 | 7/1989 | Leclercq | 376/439 |
| 5,024,806 | 6/1991 | Cioffi et al. | 376/352 |
| 5,037,605 | 8/1991 | Riordan | 376/352 |

FOREIGN PATENT DOCUMENTS

| | | |
|---|---|---|
| 311037 | 4/1989 | European Pat. Off. |
| 2500947 | 9/1982 | France ............... 376/352 |
| 2574579 | 6/1986 | France ............... 376/439 |
| 54-102493 | 11/1979 | Japan . |
| 62-145197 | 12/1985 | Japan . |

Primary Examiner—Brooks H. Hunt
Assistant Examiner—Meena Chelliah
Attorney, Agent, or Firm—Pollock, Vande Sande & Priddy

[57] ABSTRACT

The lower connector comprises an adaptor plate of square shape, traversed by water passage orifices, and a filtration plate pierced with holes of small dimensions and abutting against the adaptor plate. The water passage orifices of the adaptor plate are arranged completely symmetrically in relation to the medians and to the diagonals of the adaptor plate. The set of orifices in each of the zones of the adaptor plate limited by a diagonal and a median comprises orifices have an oblong cross-section and, if appropriate, water passage orifices of a different shape. The filtration plate comprises sets of holes of small dimensions arranged in the zones of the plate which come into alignment with the oblong orifices of the adaptor plate.

9 Claims, 4 Drawing Sheets

FIG_2

LOWER CONNECTOR FOR A FUEL ASSEMBLY OF A NUCLEAR REACTOR, COMPRISING AN ADAPTOR PLATE AND A FILTRATION PLATE

FIELD OF THE INVENTION

The invention relates to a lower connector of a fuel assembly for a nuclear reactor, particularly for a pressurized-water nuclear reactor, comprising an adapter plate of square shape, traversed by water passage orifices, and a filtration means consisting of a plate pierced with holes of small dimensions and abutting against the adapter plate.

BACKGROUND OF THE INVENTION

Pressurized-water nuclear reactors comprise a core consisting of prism-shaped assemblies arranged side by side in vertical position. The assemblies comprise a framework which is closed by connectors and in which are arranged the fuel rods held by spacer grids spaced from one another in the longitudinal direction of the assembly.

The spacer grids form a regular network, in which some locations are occupied by guide tubes intended for receiving the absorbent rods of control clusters ensuring control of the power released by the core of the nuclear reactor. At least some of the guide tubes are connected to the two connectors of the assembly by means of their end parts and ensure the junction between the framework components and the rigidity of the framework.

One of the connectors of the assemblies, called the lower connector, comes to rest on the lower core plate, which is pierced with holes in the region of each of the assemblies in order to allow the cooling water of the reactor to pass through the core in the vertical direction and from the bottom upwards.

The cooling fluid for the fuel rods passes through the adapter plate of the lower connector via orifices called water passages. Debris which may be present in the primary circuit of the reactor is liable to be carried along by the pressurized water in circulation, and when it is of small size (for example, smaller than 10 mm) this debris can pass through the adapter plate of the lower connector, the water passages of which have a large cross-section. This debris can become jammed between the fuel rods and the cells of the first grid, i.e., of the lowermost spacer grid holding the rods in the form of a regular network. This debris, subjected to the axial and transverse hydraulic stresses which are high in this zone, can wear the jacket of the fuel rod. This may result in a loss of sealing of this jacket and an increase in the rate of activity of the primary circuit of the reactor.

Devices making it possible to filter the cooling fluid while the reactor is in operation are known in the art. Such filter elements are associated with the fuel assemblies and are generally arranged in their lower connector. They generally consist of sheet-metal or metal-wire structures making it possible to detain debris having a size smaller than the largest dimension of the passage cross-section between a fuel rod and a grid cell.

Such filter elements are described, for example, in U.S. Pat. Nos. 4,664,880, 4,684,496 and EP-A-0,196,611.

Such devices can be complex and introduce a relatively high head loss into the circulation of the cooling fluid through the fuel assembly.

Moreover, these devices placed in the lower connector of the assembly can be bulky and obstructive during the loading and unloading of core assemblies and during the dismounting and refitting of the connections of the guide tubes and lower connector.

To deal with these problems, applicants' patent application FR-A-89-04840 therefore proposed a lower connector for a fuel assembly comprising a device for the retention of particles contained in the cooling fluid of the reactor, consisting of a filtration plate pierced with holes and fastened against the lower face of the adapter plate over a substantial part of its surface.

The adapter plate of such a connector comprises, in general terms, water passage orifices of cylindrical shape and of circular cross-section which extend through the adapter plate of square shape in the form of a square-mesh network. The filtration plate comprises sets of orifices of small dimensions which come into alignment with the water passage holes of the adapter plate when the filtration plate is put in place against the lower face of the adapter plate.

The arrangement of the water passage orifices in the form of a regular network and the arrangement of the holes of the filtration plate in coincidence with the water passage orifices, as described in patent application FR-A-89-04840, make it possible to obtain a water passage flow in the fuel assemblies which is maintained at an acceptable level while the reactor is in operation.

Nevertheless, it is still desirable to have the possibility of substantially increasing the flow of the primary fluid consisting of the pressurized water passing through the adapter plate of the lower connectors of the fuel assemblies.

It is likewise desirable to make it easier to machine the adapter plate and to limit the deformations of this plate as far as possible when the connector is assembled by welding.

SUMMARY OF THE INVENTION

The object of the invention is, therefore, to provide a lower connector of a fuel assembly for a nuclear reactor comprising an adapter plate of square shape, traversed by water passage orifices, and a filtration means consisting of a plate pierced with holes of small dimensions and abutting against the adapter plate, this connector making it possible substantially to increase the flow of the primary fluid penetrating into the fuel assembly, the adapter plate being designed, furthermore, so as to be capable of being machined easily and, if appropriate, welded when the connector is being assembled, without experiencing deformation in a preferred direction.

To this end, the water passage orifices of the adapter plate are arranged completely symmetrically in relation to the medians and to the diagonals of the adapter plate, the set of orifices of each of the zones comprises orifices having an oblong cross-section comprises orifices having a cross-section of oblong shape and, if appropriate, water passage orifices of a different shape, and the filtration plate comprises sets of holes arranged in zones of this plate coming into alignment with the oblong orifices of the adapter plate.

In a preferred embodiment, each of the zones of the adapter plate delimited by a median and a diagonal comprises not only orifices of oblong shape, but also orifices of cylindrical shape and of circular cross-section, likewise arranged completely symmetrically in relation to the medians and to the diagonals of the adapter plate.

BRIEF DESCRIPTION OF THE INVENTION

To facilitate comprehension of the invention, a lower connector according to the invention of a fuel assembly for a pressurized-water nuclear reactor will now be described by way of example with reference to the accompanying drawings.

DETAILED DESCRIPTION

Figure 1:
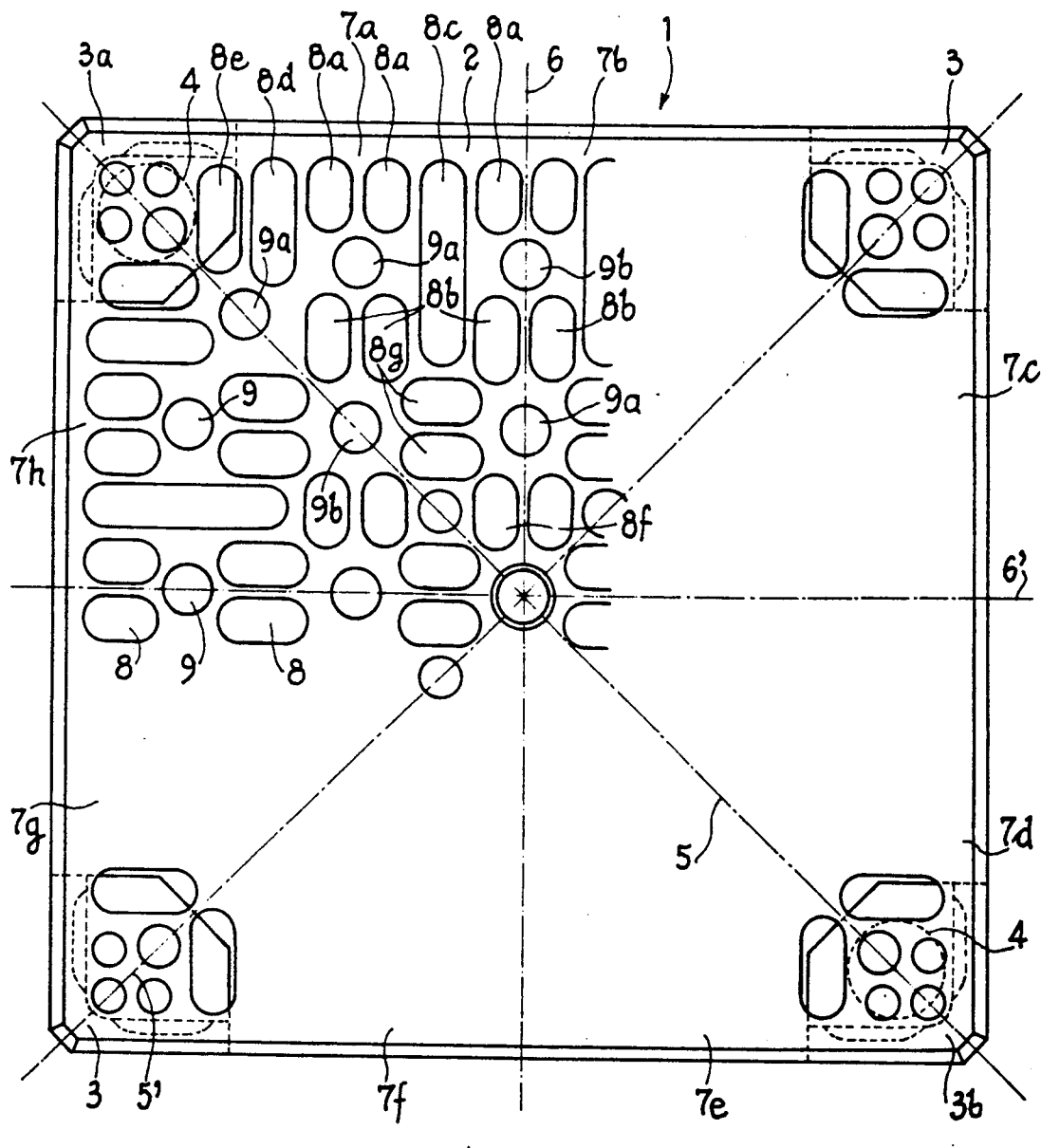
FIG. 1 is a top plan view of a connector according to the invention prior to being equipped with its filtration plate.

FIG. 1 shows a lower 1 of a fuel assembly for a pressurized-water nuclear reactor consisting of an adapter plate 2 of square shape resting on supporting feet 3 welded to the lower face of the adapter plate 2. The adapter plate 2 consists having a metal plate of a thickness of the order of 20 mm, chamfered on its outer upper edge and traversed by water passage orifices placed in a regular arrangement, to be described hereinbelow.

In general terms, the water passage orifices and fuel rods of the assembly are placed in such relative positions that a fuel rod of the assembly is never completely in vertical alignment with a water passage orifice. Thus, the rods are always held within the assembly by a part of the connector ensuring their retention.

The supporting feet 3 are arranged at the four corners of the adapter plate 2.

Two of the supporting feet, 3a and 3b, which are placed along a diagonal 5 of the adapter plate 2, comprise cylindrical holes 4 intended for engaging onto pins fixed to the lower core plate, on which the lower connector 1 comes to rest during the installation of the assembly.

The two supporting feet located on the second diagonal 5' of the adapter plate 2 do not have any holes similar to the holes 4 of the supporting feet 3a and 3b.

FIG. 1 also shows the two medians 6 and 6' of the adapter plate which constitute, with the diagonals 5 and 5', axes of symmetry in relation to which the water passage orifices extending through the adapter plate 2 are arranged completely symmetrically, as will be described below.

To describe the arrangement of the orifices extending through the adapter plate 2, the eight sectors 7a, 7b, 7c, 7d, 7e, 7f, 7g and 7h of the surface of this plate which are delimited by the diagonals 5 and 5' and by the medians 6 and 6' will be considered. These eight sectors are constituted by identical right-angled triangles having a common vertex consisting of the center of the plate 2.

The shape, dimensions and arrangement of the orifices extending through the adapter plate are identical in each of the triangular sectors 7a to 7h. Consequently, each of the orifices extending through the adapter plate 2 is symmetrical with an identical orifice both in relation to a median and in relation to a diagonal of the adapter plate. The set of orifices is therefore arranged completely symmetrically in relation to both the diagonals and the medians of the adapter plate.

Moreover, some of the water passage orifices, 8, extending through the adapter plate in the region of each of the triangular sectors 7a to 7h have a cross-section of oblong shape more or less elongate along the longitudinal axis of the cross-section.

In the preferred embodiment illustrated in FIG. 1, twelve water passage orifices of oblong shape extend through the adapter plate 2 in each of the triangular sectors 7a to 7h.

Since the arrangement, shape and dimension of the orifices are identical in each of the triangular sectors delimited by the diagonals and by the medians of the plate 2, only the arrangement of the orifices within the sector 7a will be described below.

Within the sector 7a, the adapter plate 2 has extending through it ten oblong orifices having axes parallel to the median 6 of the adapter plate 2 which forms one of the sides of the triangular sector 7a.

These ten oblong orifices are arranged as follows:

three orifices 8a of small length are aligned along the outer edge of the plate delimiting the sector 7a;

three oblong orifices 8b, slightly greater in length than orifices 8a, are aligned in a second row parallel to the row of orifices 8a and arranged towards the inside of the adapter plate 2, i.e., nearer its center than the row of orifices 8a;

one orifice 8c of greater length is interposed between two orifices 8a and two orifices 8b and extends in the space separating the row of orifices 8a from the row of orifices 8b;

one orifice 8d, the length of which is intermediate between in both instances of an orifice 8b and in both instances of an orifice 8c, is placed at the outer end of the row of orifices 8a and extends in the space separating the rows of orifices 8a and 8b;

one orifice 8e, smaller in length than orifice 8d, is arranged after this orifice towards the outside of the row of orifices 8a and 8d in the direction of the corner of the plate 2;

finally, one orifice 8f of a length substantially equal to that of orifices 8a is placed in proximity to the center of the plate 2.

The set of oblong orifices 8 arranged in the triangular sector 7a also comprises two orifices 8g, substantially identical in length to orifices 8a and 8f. The two orifices 8g have longitudinal axes parallel to the median 6' of the adapter plate 2 and to the outer side of the adapter plate 2 delimiting the sector 7a. The orifices 8g are interposed between the row of orifices 8b and the orifice 8f.

In addition to the twelve orifices of oblong shape, the adapter plate comprises, in each of the triangular sectors 7a, nine cylindrical orifices of circular cross-section.

These orifices are arranged as follows:

five orifices are centered on the diagonal 5;

two orifices are centered on the median 6; and two orifices are located entirely within the triangular sector 7a.

Of these nine circular orifices, the two circular orifices located in proximity to the corner of the plate 2 above the foot 3a, and one on the diagonal 5 and the other within the sector 7a, have a smaller diameter than the other seven circular orifices.

Of these other orifices of larger diameter, the three orifices 9a, of which one is located on the diagonal 5, another on the median 6 and the third within the triangular sector 7a, serve for the engagement and fastening of the end of guide tubes of the assembly. Two orifices 9b, of which one is located on the diagonal 5 and the other on the median 6, are used for fastening the filtration plate to the adapter plate by means of rivets.

The other orifices of circular shape constitute water passages, like oblong water passages 8.

Figure 2:
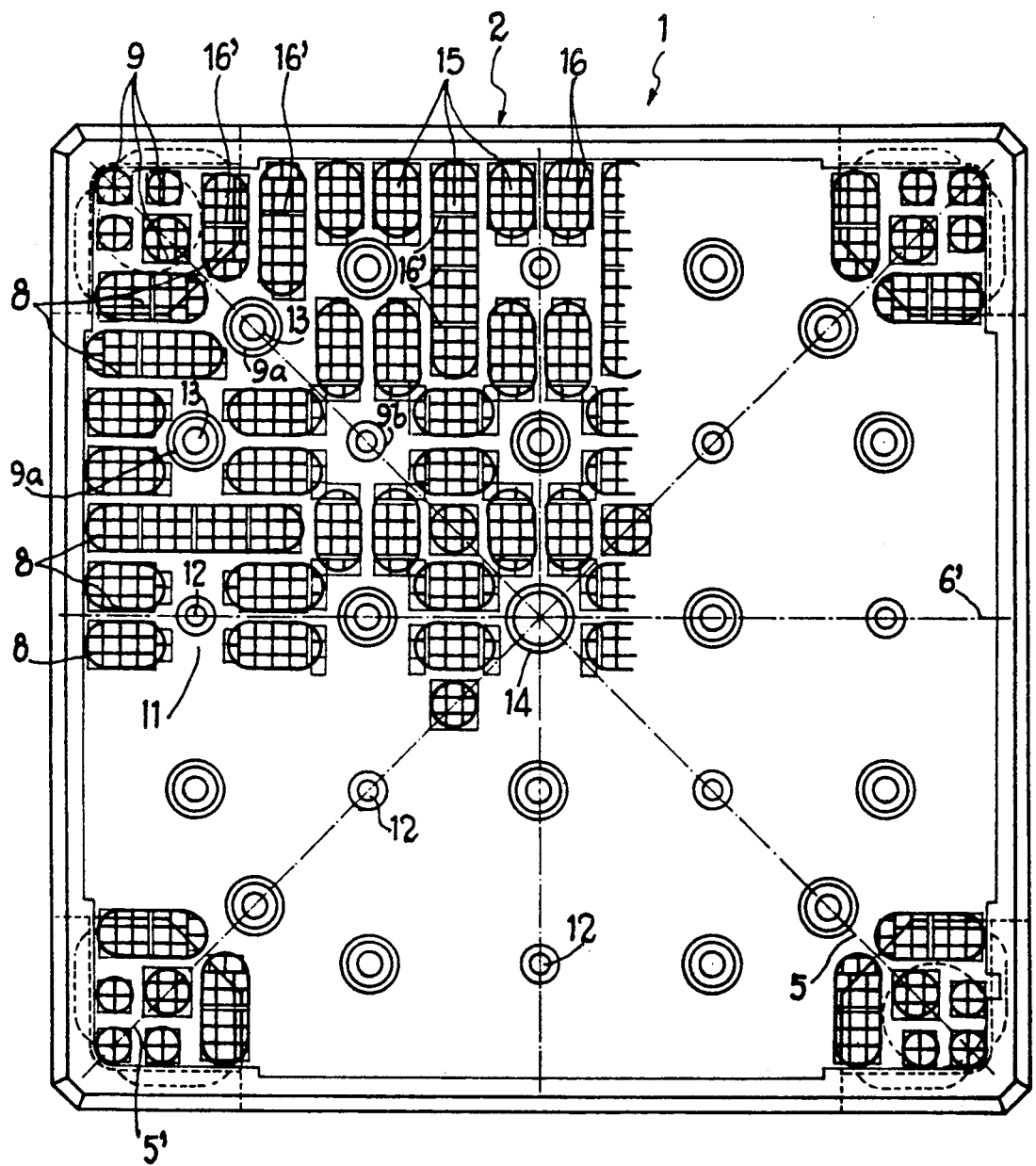
FIG. 2 is a top plan view of the connector according to the invention shown in FIG. 1, equipped with its filtration plate.

FIG. 2 shows the adapter plate 2 of FIG. 1, to the upper face of which a filtration plate 11 of small thickness has been attached and fastened in an abutting arrangement. As regards a connector of an assembly for a pressurized-water nuclear reactor, of which the adapter plate has a side about 20 cm in length and a thickness of the order of 20 mm, a filtration plate of a thickness of about 2 mm is used.

The filtration plate 11 is fastened to the adapter plate 2 by means of eight rivets 12, each introduced into an orifice 9b extending through the adapter plate 2.

The sixteen guide tubes 13 of the assembly are each fastened in an orifice 9a of the adapter plate and extend through a corresponding orifice of the filtration plate.

In the central part of the connector 1, an instrumentation tube 14 is fastened within an orifice of circular cross-section extending through the adapter plate and a corresponding orifice of the filtration plate.

The filtration plate 11 comprises sets 15 of orifices of small dimensions in the form of square-mesh networks, and, when the plate 11 is laid against the adapter plate 2, these come into alignment with the oblong water passage orifices 8 of the adapter plate and with the circular orifices 9, with the exception of the orifices 9a and 9b used for fastening the guide tubes 13 and rivets 12.

Each of the filtration sets 15 is in the form of a square-mesh sieve arranged in a rectangular or square orifice extending through the filtration plate 11. The sieves of the sets 15 consist of thin wires or bars 16, intersecting and fastened to one another.

The sieves could also be produced by punching of the plate 11, so as to delimit the cells of the sieves by means of ligaments consisting of the metal of the plate 11.

The square meshes of the sieves 15 are of a dimension of the order of 3 mm.

The filtration sets or sieves 15 arranged in alignment with the orifices of largest dimensions of the adaptor plate, such as the orifices 8c, 8d and 8e, may comprise one or more reinforcing struts 16' of larger cross-section than the wires or ligaments 16 constituting the sieve 15. In fact, the cross-sections of the wires or ligaments constituting the sieves 15 have the smallest possible dimensions, in order to reduce the head loss during the passage of the cooling water and to increase the cooling flow for the fuel assembly. The sieves 15 are therefore liable to experience deformation when debris of large mass is retained, where sieves superposed on the orifices of largest cross-section are concerned, with the result that struts 16' may be necessary to obtain sufficient rigidity and strength of the sieves 15.

Figure 3:
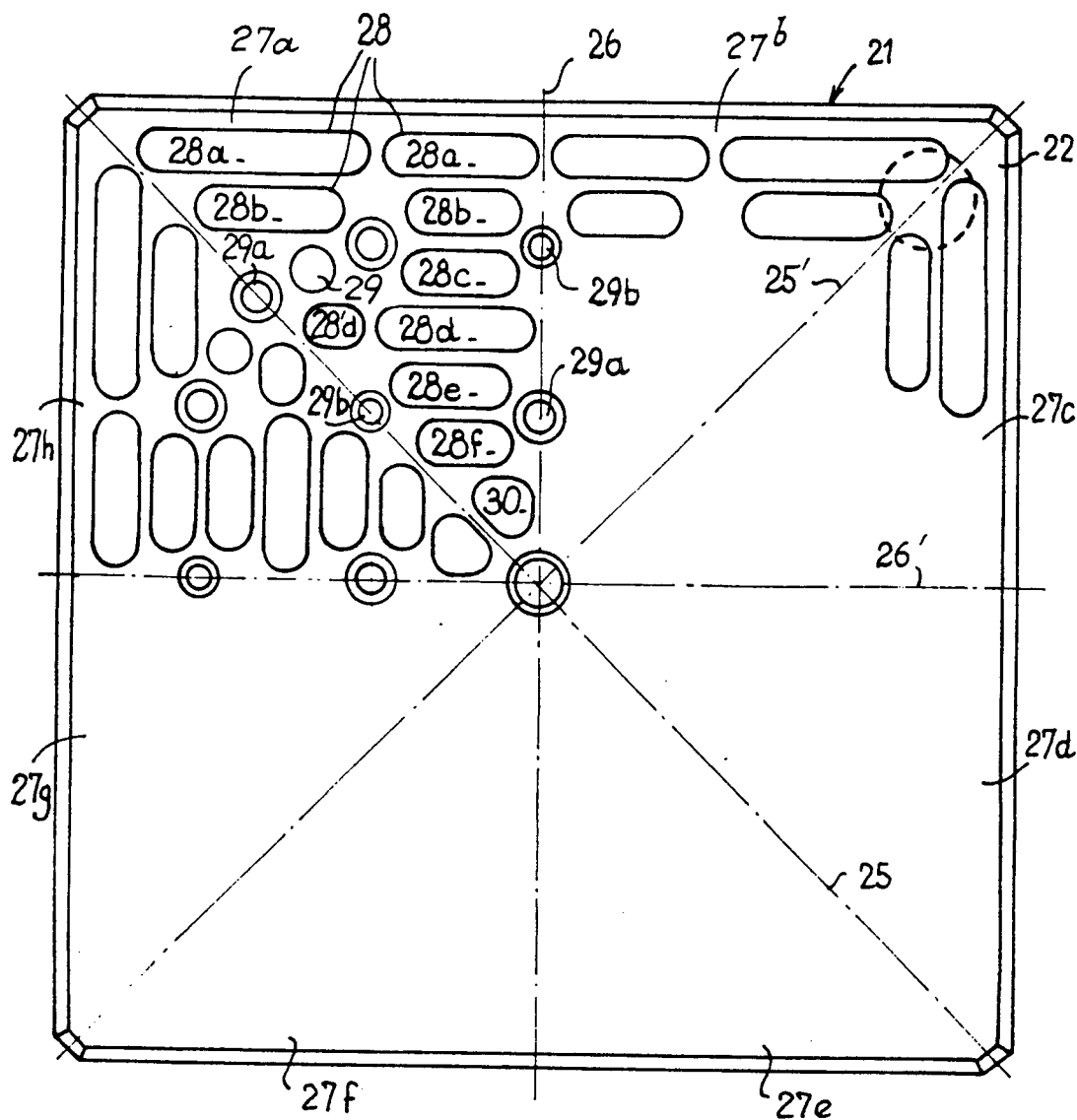
FIG. 3 is a view similar to the view of FIG. 1 and relating to a second embodiment of the adapter plate.

FIG. 3 illustrates a second embodiment of the adaptor plate of a connector according to the invention.

The adaptor plate 22 of the connector 21 comprises orifices which are arranged completely symmetrically in relation to the diagonals 25 and 25' and to the medians 26 and 26' of the adaptor plate, as in the embodiment of FIGS. 1 and 2.

As before, the diagonals and medians define eight triangular sectors 27a, 27b, 27c, 27d, 27e, 27f, 27g and 27h, in which the orifices of the adaptor plate have identical shapes, dimensions and arrangements.

The orifices extending through the sector 27a of the plate 22 will be described.

Within the sector 27a, a set of oblong orifices 28 and orifices of circular cross-section 29 extend through the plate.

The set of oblong orifices comprises:

two orifices 28a of great length arranged in a first row along the edge of the adaptor plate parallel to the median 26', two oblong orifices 28b, of smaller length than the orifices 28a, arranged in a row parallel to the median 26' and placed towards the inside of the adaptor plate in relation to the row of orifices 28a, one orifice 28c of substantially the same length as orifices 28b and aligned with a circular orifice 29 in a third row parallel to the median 26', one orifice 28d, and one orifice 28'd shorter than orifice 28d, both arranged in a fourth row, one orifice 28e and one orifice 28f parallel to the median 26' and located in sequence in the direction of the center of the plate 22.

In addition to the oblong orifices 28 and the circular orifice 29 plate 22 comprises a water passage orifice 30 in the form of a triangle with rounded corners placed in proximity to the center of the plate 22.

As in the embodiment of FIGS. 1 and 2, the circular orifices 29a are intended for receiving guide tubes of the assembly and the circular orifices 29b for receiving fastening rivets of a filtration plate which is laid against the adaptor plate 22 and which comprises orifices of small dimension which come into alignment with the water passage orifices 28 and 29.

In sector 27a of the embodiment of FIG. 3, the oblong orifices all extend in the same direction parallel to one of the medians of the adapter plate within a triangular sector. However, for the adapter plate 22 as a whole, the oblong orifices arranged symmetrically are oriented in the directions of both medians 26 and 26'.

Figure 4:
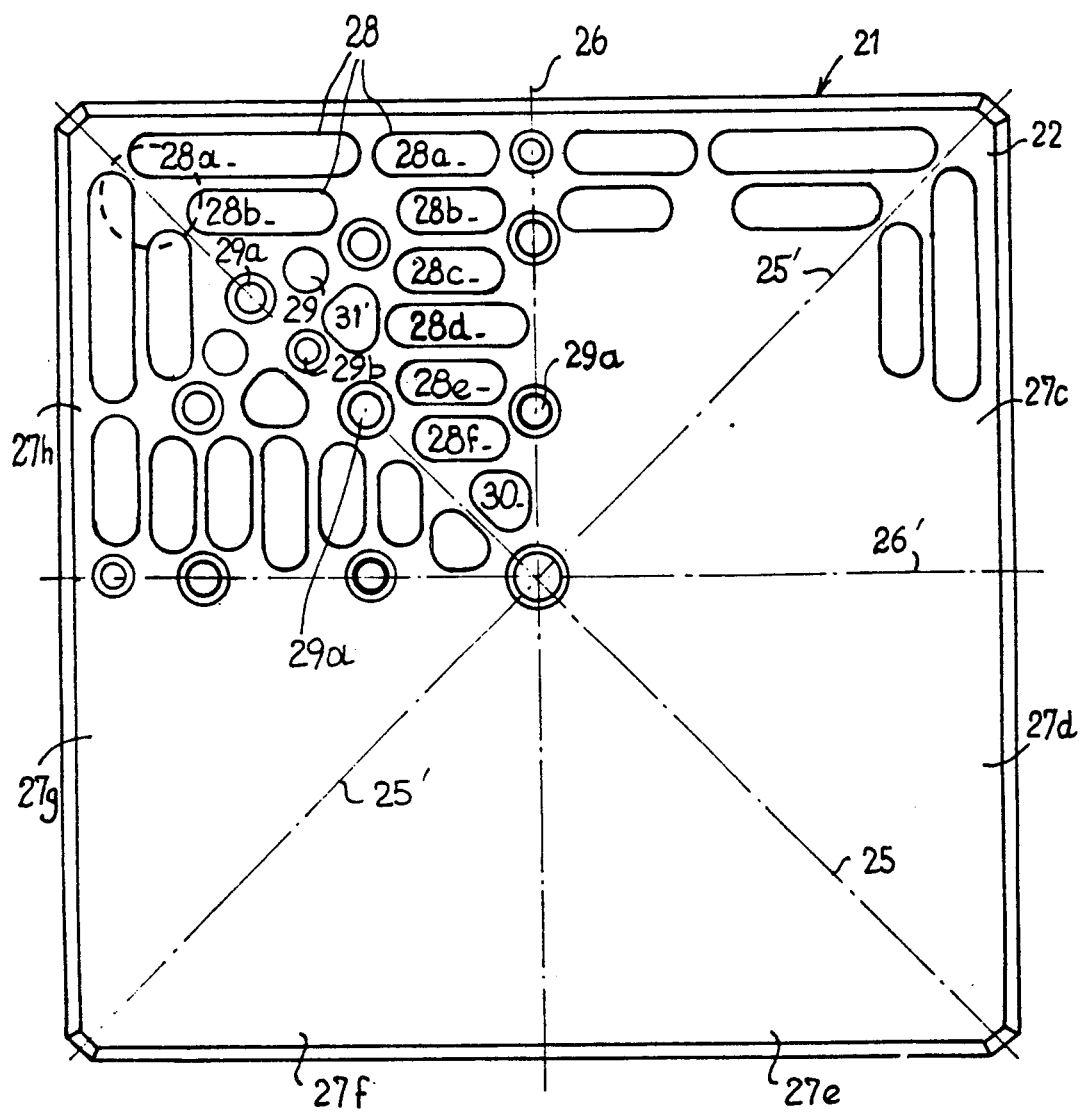
FIG. 4 is a view similar to the view of FIG. 2 and relating to a third embodiment of the adapter plate.

FIG. 4 illustrates a third embodiment of an adapter plate of a connector according to the invention.

The corresponding elements in FIGS. 3 and 4 bear the same references. The two versions differ in that the oblong orifice 28'd of small length is replaced by a triangular orifice 31' with rounded corners in the second version, and in that the adaptor plate comprises twenty-four orifices 29a allowing the fastening of guide tubes, instead of sixteen orifices as in the embodiments of FIGS. 1, 2 and 3.

In this third embodiment, eight additional holes, 29b, allow the fastening of a filtration plate by means of rivets.

The lower connector according to the invention permits the passage of a high flow of water in the fuel assembly, while at the same time ensuring efficient filtration of this fluid. The arrangement of the apertures, in two different directions and symmetrically, allows the adapter plate to have good mechanical strength in these two directions and thus prevents a preferred orientation of the deformations along one of the axes. The rigidity of the adapter plate is identical in both directions of the adaptor plate, in contrast to the situation when the orifices are arranged in only one direction. Furthermore, the machining of the adaptor plate becomes easier and the adaptor plate experiences only slight deformations during the welding thereof for the purpose of making the connector.

The number and distribution of the oblong water passage orifices of the adaptor plate, may be varied from those indicated or described above.

The adaptor plate of a connector according to the invention may comprise solely water passage orifices, of oblong cross-section, or both oblong water passage orifices and cylindrical water passage orifices of circular cross-section.

Finally, the invention can be used not only in fuel assemblies for a pressurized-water nuclear reactor, but also in fuel assemblies for any water-cooled nuclear reactor.

We claim:

1. Lower connector for a fuel assembly of a nuclear reactor, said lower connector comprising an adapter plate (2) of square shape traversed by water passage orifices (8, 9), and a filtration plate (11) pierced with holes of small dimensions and located in abutment with said adaptor plate (2), said water passage orifices of said adaptor plate being arranged completely symmetrically to one another in relation to medians (6, 6') and diagonals (5, 5') of said adaptor plate (2), each sector (7a, 7b, 7c, 7d, 7e, 7f, 7g, 7h) of said adaptor plate (2) delimited by a median (6, 6') and a diagonal (5, 5') comprising orifices (8) having an oblong shape in cross-section, and said holes in said filtration plate (11) comprising sets of said holes (15) arranged in zones of said filtration plate (11) aligned with water-passage orifices (8) of said adaptor plate.

2. Lower connector according to claim 1, wherein said adaptor plate (2) further comprises water passage orifices (9) of cylindrical shape and of circular cross-section, arranged completely symmetrically in relation to said medians (6, 6') and to said diagonals (5, 5') of said adaptor plate.

3. Lower connector according to claim 1 or 2, wherein said adaptor plate (22) further comprises orifices (30, 31) in the form of a triangle with rounded corners.

4. Lower connector according to claim 1, wherein said sectors (7a to 7h) are triangular, some of the orifices (8) of oblong shape in each said triangular sector having a cross-section a longitudinal axis of which points in a direction parallel to a first median (6, 6') of said adaptor plate, and the others of said orifices of oblong shape have a cross-section the longitudinal axis of which points in a direction parallel to a second median (6, 6') of said adaptor plate (2).

5. Connector according to claim 1, wherein said adaptor plate comprises, in each of said zones (7a, 7b to 7h), holes (9a) for fastening guide tubes of a said fuel assembly to said lower connector and holes (9b) for fastening said filtration plate (11) to said adaptor plate (2) which are of cylindrical shape and of circular cross-section and which are arranged completely symmetrically in relation to said diagonals (5, 5') and to said medians (6, 6') of said adaptor plate (2).

6. Connector according to claim 1, wherein said orifices (8, 28) having cross-sections of oblong shape and arranged within a zone (7a to 7h; 27a to 27h) delimited by a median (6, 6'; 26, 26') and a diagonal (5, 5'; 25, 25') constitute sets of orifices (8a, 8b, 8c, 8d, 8e, 8f, 8g; 28a, 28b to 28h) having different lengths in their axial direction.

7. Lower connector according to claim 4, wherein in each of said zones (7a to 7h), said adaptor plate comprises ten oblong orifices (8a, 8b, 8c, 8d, 8e, 8f) having a cross section the longitudinal axis of which points in a first direction parallel to a first median (6) of said adaptor plate (2), and two orifices (8g) having a cross section the longitudinal axis of which points in a second direction parallel to a second median (6') of said adaptor plate (2).

8. Connector according to claim 1, wherein said filtration plate (11) comprises orifices of rectangular shape, in which are arranged filtration sets (15) in the form of sieves, superposed on said water passage orifices (8, 9) of said adaptor plate (2).

9. Connector according to claim 8, wherein said sieves consist of ligaments (16) of small cross-section, at least some of said ligaments comprising reinforcing struts (16') the cross-section of which is larger than a cross-section of said ligaments delimiting cells of said sieves (15).

* * * * *